(12) United States Patent
Smahl

(10) Patent No.: US 7,469,935 B2
(45) Date of Patent: Dec. 30, 2008

(54) PIPE FITTING COMPRISING AT LEAST TWO LAYERS OF DIFFERENT MATERIAL, THE INNERMOST LAYER MADE OF PLASTIC

(75) Inventor: Jarmo Smahl, Nastola (FI)

(73) Assignee: Uponor Innovation AB, Fristad (SE)

( * ) Notice: Subject to any disclaimer, the term of this patent is extended or adjusted under 35 U.S.C. 154(b) by 77 days.

(21) Appl. No.: 10/501,802

(22) PCT Filed: Jan. 20, 2003

(86) PCT No.: PCT/FI03/00038

§ 371 (c)(1), (2), (4) Date: Feb. 9, 2005

(87) PCT Pub. No.: WO03/060371

PCT Pub. Date: Jul. 24, 2003

(65) Prior Publication Data
US 2005/0121913 A1    Jun. 9, 2005

(30) Foreign Application Priority Data
Jan. 21, 2002    (FI)    ................................ 20020107

(51) Int. Cl.
*F16L 33/00*    (2006.01)

(52) U.S. Cl. ................... 285/242; 285/133.11; 285/179

(58) Field of Classification Search ................... 285/47, 285/50, 55, 222.4, 133.5, 133.11, 179, 61, 285/242, 244
See application file for complete search history.

(56) References Cited

U.S. PATENT DOCUMENTS

| | | | |
|---|---|---|---|
| 2,757,023 A * | 7/1956 | Hein ........................... | 285/31 |
| 2,769,647 A * | 11/1956 | Harstick et al. ............... | 285/31 |
| 4,036,513 A * | 7/1977 | Loftus et al. ................. | 285/179 |
| 4,676,532 A * | 6/1987 | Gronau et al. ............ | 285/133.5 |
| 4,681,349 A * | 7/1987 | Press et al. ..................... | 285/55 |
| 4,717,182 A * | 1/1988 | Behrens et al. ............. | 285/230 |
| 4,979,679 A | 12/1990 | Downs ........................ | 239/548 |
| 5,007,666 A * | 4/1991 | Kyfes ........................... | 285/373 |
| 5,183,299 A * | 2/1993 | Hallerstrom et al. .......... | 285/47 |
| 5,299,839 A * | 4/1994 | Mogavero .................... | 285/110 |
| 5,411,300 A * | 5/1995 | Mitsui ...................... | 285/294.1 |
| 5,507,532 A * | 4/1996 | Mitsui ........................... | 285/61 |
| 5,743,569 A * | 4/1998 | Deters et al. .................... | 285/3 |
| 6,220,634 B1 * | 4/2001 | Burrowes .............. | 285/133.11 |
| 6,533,326 B1 * | 3/2003 | Socier et al. ................... | 285/55 |

FOREIGN PATENT DOCUMENTS

| | | |
|---|---|---|
| DE | 197 35 919 C1 | 11/1998 |
| DE | 298 14 047 U1 | 12/1998 |
| DE | 299 07 585 U1 | 9/1999 |

(Continued)

*Primary Examiner*—David E Bochna
(74) *Attorney, Agent, or Firm*—Occhiuti Rohlicek & Tsao LLP

(57) ABSTRACT

A pipe fitting for connecting at least two pipes, the pipe fitting (1) comprising at least two layers. An innermost layer (2) and an outer layer (3) are of different materials. The innermost layer (2), which gets into contact the liquid to be conveyed, is made of plastic tolerating high temperatures. The outer layer (3) is formed of such materials that the outer surface is arranged to function as the provider of oxygen diffusion protection and/or the UV protector.

18 Claims, 1 Drawing Sheet

FOREIGN PATENT DOCUMENTS

| | | |
|---|---|---|
| DE | 200 14 785 U1 | 2/2001 |
| EP | 0 530 387 B2 | 3/1993 |
| EP | 0 636 828 A1 | 2/1995 |
| EP | 1 022 504 A1 | 1/1999 |
| EP | 1 031 781 A2 | 2/2000 |
| GB | 1 481 256 | 7/1977 |
| GB | 2 211 506 A | 7/1989 |
| JP | 03-184817 | 8/1991 |
| WO | WO 88/04388 | 6/1988 |
| WO | 2005/052433 * | 6/2005 |

* cited by examiner

PIPE FITTING COMPRISING AT LEAST TWO LAYERS OF DIFFERENT MATERIAL, THE INNERMOST LAYER MADE OF PLASTIC

FIELD OF THE INVENTION

The invention relates to a pipe fitting for connecting at least two pipes.

BACKGROUND OF THE INVENTION

Plastic hot-water pipe systems and domestic water pipe systems are usually intended to be mounted inside a structure, such as a partition floor or a partition wall, by using protecting tubes. The pipe fittings are made to be of a colour different from the pipes, whereby they are clearly different from each other. Further, pipe fittings are typically provided with reinforcing ribs and other irregularities on the outer surface, which causes the fittings to gather dirt and makes it extremely difficult to keep the outer side of the pipe systems clean.

Solutions for connecting pipes to each other are disclosed in publications DE 19 735 919, DE 29 814 047 and DE 29 907 585, for example. The publications describe a solution comprising a pipe fitting made of metal or plastic, the end of which is arranged inside the pipe to be connected. A compression sleeve made of metal is typically arranged in the outside of the pipe to be connected, the sleeve being pressed around the pipe to guarantee the tightness of the connection between the pipe fitting and the pipe. Manufacturing costs of such pipe fittings are rather high, and in addition, modifiability of their appearance is rather difficult.

EP publication 0 530 387 also discloses a solution for providing a pipe connection, in which the end of the pipe to be connected is expanded, and it is pushed upon the pipe fitting. A compression band can further be arranged in the outside of the pipe to be connected, the band being made of plastic having a memory in such a way that the compression band arranged upon the connection tends to return to the smaller diameter remembered by the material, pressing the connection tight. The solution is rather functional and easy to use but requires the use of an expanding tool and therefore also the expanding of the pipe as a separate stage of operation in mounting.

SUMMARY OF THE INVENTION

An object of the present invention is to provide a versatile and, compared to the prior art, an improved pipe fitting.

A pipe fitting according to the invention is characterized in that the pipe fitting comprises at least two layers in such a way that the innermost layer is made of a material different from the outer layer, and that the innermost layer is made of plastic tolerating high temperatures, and that the outer layer is formed of such a material that the outer layer is arranged to function as the provider of oxygen diffusion protection and/or the UV protector.

The essential idea of the invention is that the pipe fitting comprises at least two layers in such a way that the innermost and outer layers are of different materials. The innermost layer, which gets into contact with the liquid to be conveyed, is made of plastic tolerating high temperatures. The outer layer is formed of such a material that the outer layer is arranged to function as the provider of oxygen diffusion protection and/or the UV protector. The materials of the different layers are selected in such a way that the outer layer is not attached to the innermost layer. The idea of a preferred embodiment is that the outer layer is arranged to function as the provider of chemical durability, for instance against detergents, paints etc. The idea of a second preferred embodiment is that the outer layer is arranged to function as mechanical reinforcement. The idea of a third preferred embodiment is that the end of the outer layer of the pipe fitting functions as a stop member which ensures that the pipe is not inserted too far into the pipe fitting. On the other hand, inserting the pipe in such a way that it is in contact with the stop member guarantees tight and reliable connection. The idea of a fourth preferred embodiment is that the innermost layer is made of polyphenyl sulphone PPSU or polysulphone PSU. The idea of a fifth preferred embodiment is that the outer layer is made of a material less expensive than the innermost layer, for example of polyamide PA, polypropylene PP or polyethylene PE.

Advantage of the invention is that the manufacturing costs of the pipe fitting are low. Further, oxygen diffusion protection and UV protection of the pipe fitting are very good, which is important when, for example, parts are stored on construction sites for long times and pipe fittings are used in surface mounting. The pipe fitting can be provided with an extremly good chemical resistance. Further, it is simple and easy to modify the appearance of the pipe fitting. It is also easy to make the impact resistance of the pipe fitting extremely good. When the different layers are not attached to each other, the pipe fitting is very resistant to shear stress. This is because the surface that are moving/separate relative to each other transfer forces more flexibly and more advantageously. The different layers of the pipe fitting can be formed at different times, because it is not desirable that the different layers become attached to each other. Hence, forming the production process of the pipe fitting is reasonably simple. Further, the material of the innermost layer can be selected to be rather hard, whereby the outer layer is not easily attached to the hard material. The material of the inner layer is perferably very hard in order for it to bore into the softer inner wall of the pipe to be fitted upon implemention of the fitting, and to form a tight fitting. Forming a stop member of the end of the outer layer makes the connecting of the pipe to the pipe fitting easy, and thus, a tight and reliable fitting is ensured. In addition, since the end of the outer layer functions as the stop member, no other stop member is required that would make it difficult to keep the system clean, for instance.

BRIEF DESCRIPTION OF THE DRAWINGS

The invention will now be described in more detail with reference to the attached drawings, in which.

DETAILED DESCRIPTION OF THE INVENTION

Figure 1:
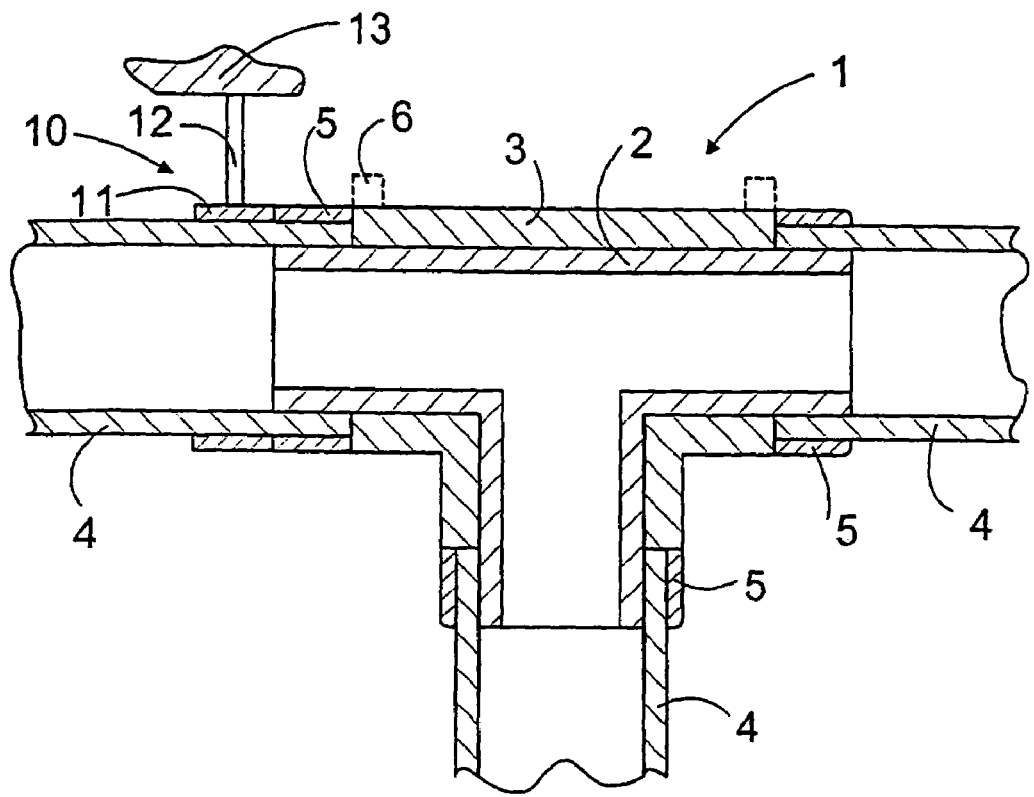
FIG. 1 shows a side view and a cross-section of a single branch.

FIG. 1 shows a pipe fitting 1, more precisely a single branch. The pipe fitting frame comprises an innermost layer 2 and outer layer 3 outside it. The pipe fitting 1 is used to connect pipes 4 to each other. The pipes are plastic pipes or composite pipes comprising a plastic innermost layer and metal outside it, for example a layer made of aluminium. Outside the metal layer, there may further be a plastic layer, for instance. The end of the pipe fitting 1 is arranged inside the end of the pipe 4, and the connection can still be reinforced with a compression collar 5. The pipe fitting 1 is intended to be used in hot-water and domestic water pipe systems, for instance. The pipe fitting 1 can also be used in pneumatic or industrial systems. Thus, the innermost layer 2, which gets into contact with the liquid to be conveyed, is made of a material tolerating high temperatures, such as polyphenyl sulphone PPSU or polysulphone PSU. Typically, the innermost layer material must tolerate a temperature of 70° for 50 years. Momentarily, the innermost surface material must tolerate a pressure of 10 bar at a temperature of 90 to 120° C. Polyvinylidene fluoride PVDF, polyketones, polyether ketone PEEK or some other plastic with sufficient properties can also be used as the material of the innermost layer 2. The plastic can be pure or reinforced with different filler materials of fibres.

The outer layer 3 functions as the provider of oxygen diffusion protection and the ultraviolet protector, i.e. UV protector. As regards the UV protector, it is most preferable to colour the outer layer 3 black, but after that, a layer of another colour can be arranged outside the outer layer 3, or the outer surface of the outer layer 3 can be painted with another colour. In addition, the outer layer 3 can function outwards as the provider of chemical resistance, whereby for instance detergents or paints cannot damage the pipe connection 1. Further, the outer layer 3 can function as mechanical reinforcement and improve the impact resistance of the pipe fitting 1. It is preferable to add ingredients adding reinforcement, such as fibres, only to the outer layer 3, because then they do not decrease the hydrolytic resistance of the innermost layer 2. The outer layer 3 is formed of material less expensive than the innermost layer 2. The material of the outer layer 3 can be polyamide PA, polypropylene PP or polyethylene PE, for example. As noted above, the materials of the different layers have been selected in such a way that the outer layer 3 is not essentially attached to the innermost layer 2. The material of the innermost layer 2 can be very hard. The pipe fitting can be manufactured in such a way that the different layers are manufactured at different times. In such a case, forming the production process is reasonably simple although the solidifying points of the different materials are different. For example, the solidifying point of polyphenyl sulphone PPSU forming the innermost layer 2 is about 220° C., whereas the solidifying point of polypropylene PP or polyamide PA forming the outer layer is about 130° C. With respect to the production process, however, these temperature differences do not cause problems. On the contrary, in this case the difference in the solidifying temperatures is beneficial. For instance, the processing temperature of polypropylene PP is more than 200° C. It is thus advantageous for the innermost layer 2 to be formed of polyphenyl sulphone PPSU, for example, the solidifying point of which is about 220° C. Thus, the polyphenyl sulphone PPSU forming the innermost layer 2 does not melt when the outer layer 3 is being formed.

The compression collar 5 can be for example a metallic compression sleeve which is pressed with a compression tool in such a way that the compression sleeve is locked into such a shape that it presses the pipe 4 tightly into contact with the pipe fitting 1. Further, the compression collar 5 can be a compression band with which the pipe 4 is tightened into contact with the pipe fitting 1. The compression collar can also be a compression ring formed of crosslinked polyethylene PEX, which ring is stretched upon the pipe 4, whereby the compression ring tends to return to the smaller diameter determined by the memory of the material and is thus tightly pressed around the pipe 4.

The thickness of the outer layer 3 can be determined such that the outer diameter of the pipe fitting 1 at the point of the outer layer 3 is equal to the outer diameter of the compression collar 5 when it is fitted in place. Thus, the appearance of the pipe fitting 1 is tidy and the structure is easy to keep clean. When the outer diameter of the compression collar 5 is equal to the outer diameter of the pipe fitting, the outer surface of the connecting member formed by them can be made completely smooth, which, as mentioned, ensures that it is easy to keep the structure clean. Further, in order to facilitate the cleaning, the end of the compression collar 5 on the side of the pipe 4 can be shaped rounded.

The outer layer 3 can be provided with protrusions 6 indicated by the broken line in FIG. 1. The protrusions 6 function in connection with the compression collar 5 as the limiter of the mounting tool used. By means of the protrusion 6 it can thus be ensured that the compression collar 5 is placed at the correct point and that the compression of the mounting tool, for example, is directed at the compression collar 5 and does not damage the pipe fitting 1. If the outer diameter of the outer layer 3 is greater than the outer diameter of the compression collar 5, protrusions 6 are not necessarily needed.

The walls of the inner layer 2 can be made substantially smooth, in other words such that the inner layer has no grooves or protrusions. Such a part is extremely simple and quick to manufacture, because for example the injection mould is simple and the material cools evenly during the manufacture.

In connection with the pipe fitting 1, a support 10 can be used to support the pipe 4 and the pipe fitting 1. The support 10 comprises a support collar 11 attached to a structure 13 with an arm 12, for example to a ceiling or wall. The width of the support collar 11 is most preferably equal to the width of the compression collar 5. Further, most preferably, the outer diameter of the support collar 11 is substantially equal to the outer diameter of the compression collar 5 and the pipe fitting 1. Thus, the appearance of the connection system is extremely tidy and it is easy to keep clean.

Figure 2:
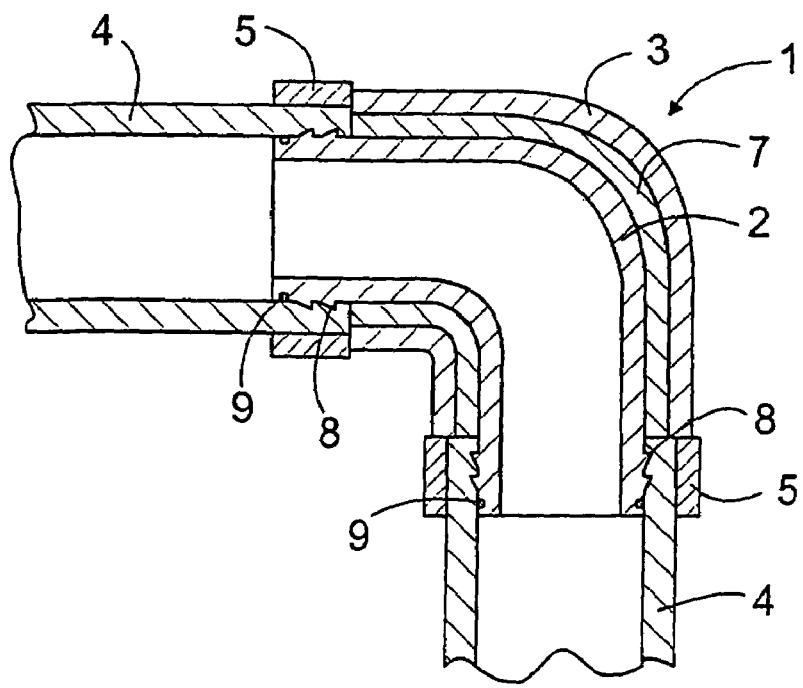
FIG. 2 shows a side view and a cross-section of a bend.

FIG. 2 shows another pipe fitting 1, more precisely a bend. There is an intermediate layer 7 between the innermost layer 2 and the outer layer 3. The intermediate layer 7 can be a foamed plastic material layer. The foamed material is preferably provided by adding overcritical carbon dioxide to the mass to be injection-moulded, which carbon dioxide makes the mass more pliable and results in microporous foam. Thus, high quality is achieved for the outer surface, for example, without having to use very high compression pressures.

The outer surface of the innermost layer 2 can be provided with barbs 8, which guarantee that the pipe 4 keeps attached to the pipe fitting 1. There may further be a sealing groove or sealing grooves for a sealing ring 9 on the outer surface of the innermost layer 2.

The drawing and the related specification are only intended to illustrate the idea of the invention. The details of the invention can vary within the claims. Thus, the material of the outer surface 3 can also contain fibre reinforcement, whereby the mechanical properties of the pipe fitting 1, such as the impact resistance, can be made extremely good. The outer surface is easily arranged to be of the same colour as the pipe 4, whereby in surface mounting, for example, the result is tidy. Thus, the colour of the compression collar 5 is also most preferably the same as the colour of the pipe 4 and the colour of the pipe fitting 1. Hereby, also the innermost layer 2 can be of the same colour as the outer layer 3. All parts of the pipe fitting 1, or only the outer parts, if desired, can be coloured for instance with mica or metal pigment. Mica or metal pigments have good gloss properties, so that they reflect UV radiation, for instance. It is possible to provide the pipe fitting with a colour which is to a great extent similar to that of brushed stainless steel, for example. A preferred embodiment is to form the outer layer 3 of copolymer containing styrene, for example of acrylonitrile/butadiene/styrene ABS, which is a material easy to metallize. Further, the outer layer 3 may be formed as a separate and replaceable part, which can be arranged in the pipe fitting 1 with quick-release locking, for instance. In such a case, modifying the colour and/or shape of the pipe fitting 1 is extremely easy, quick and simple. The pipe fitting 1 can thus be for instance a single branch or a bend, but it can also be what is called a connector part, whereby it is used for connecting two parallel pipes to each other.

The pipe 4 can be made beautiful so that it can even be considered aesthetically decorative when it is mounted as surface mounting. A plastic composite pipe is particularly suitable for surface mounting, because bending it to a desired radius of curvature is easy, but when the pipe is mounted straight, it also stays straight. Thus, the innermost layer of the plastic composite pipe is typically made of polyethylene PE tolerating a high temperature or crosslinked polyethylene PEX. Outside the innermost surface, there is a metallic barrier layer, and outside the metallic layer, there may be a plastic outer surface. The metallic layer can be coated with transparent plastic, for example. Another option is to add metal colour pigments to the plastic of the outer layer. Thus, a bright metal-coloured pipe is provided, with which beautiful and visible pipe system instalments can be provided, for example in bathrooms. Such a product is particularly suitable for renovations, but owing to its beautiful appearance, such a pipe functions even as a furnishing element.

A colour effect shaped as a spiral or a helix can be provided on the outer surface of the pipe by using a rotational nozzle. Appropriate transparent outer surface materials include for example bright polypropylene PP, cyclic polyolefins, acryl, polycarbonate and other thermoplastics applicable to the purpose. Appropriate colour pigments include for instance pearlescent pigments in the Iriodin series of the company Merck KgaA, for example Silver White Pigment, Interference Pigments, Goldglanz Pigments and Metaglanz Pigments. Such metal colour pigments are typically made of mineral mica by coating them with a thin layer of metal oxide. The pigment increases the UV protection of the pipe and the pigment is also heat-resistant.

Metallic barriers appropriate for forming a metal layer of a plastic composite pipe include a welded or glued aluminium foil with a thickness of 0.2 to 3 mm. Further, appropriate metal barriers include a stainless steel foil having a thickness of 0.05 to 1 mm and a copper foil having a thickness of 0.1 to 1 mm. A suitable surface treatment for the above-mentioned metals is brushing, for example. The metal barrier layer can also be formed by sputtering or with galvanic treatment, in which case the thickness of the metal surface can be thinner than the mentioned values. In such a case, an external metal surface is not necessarily needed at all. The external transparent plastic layer can be for instance 100 μm to 3 mm. Acrylic varnish, for example, is very good as a thin layer.

An extremely tidy and beautiful solution can be provided when the pipe 4, most preferably a plastic composite pipe, the supports 10 and the pipe fitting 1 with its compression collars 5 are of the same colour. When the pipe fitting 1 and the compression collar 5 connected to it are of the same colour, the surface of one of them can be made embossed, in which case, being of the same colour, they are aesthetically beautiful, but the compression collar 5 can still be distinguished from the pipe fitting 1 by appearance.

The invention claimed is:

1. A pipe fitting for connecting at least two pipes, which pipe fitting comprises at least an innermost layer and an outer layer in such a way that the innermost layer is made of a material different from the outer layer, and that the innermost layer is made of plastic tolerating high temperatures, and that the outer layer is formed of such a material that the outer layer is arranged to function as the provider of oxygen diffusion protection and/or the UV protector, wherein the materials of the different layers are selected in such a way that the outer layer is in contact with but not secured to the innermost layer, such that the surfaces of the innermost layer and the outer layer are able to move relative to each other, wherein the innermost layer is made of polyphenyl sulphone, polysulphone, polyvinylidene fluoride, polyketone, or polyether ketone, and wherein the outer layer is made of polyamide, polypropylene, polyethylene, acrylonitrile-butadiene-styrene, or a copolymer containing styrene.

2. A pipe fitting according to claim 1, wherein the outer layer is arranged to function as the provider of chemical resistance.

3. A pipe fitting according to claim 1 wherein the outer layer is arranged to function as mechanical reinforcement.

4. A pipe fitting according to claim 1, wherein the walls of the innermost layer are formed smooth.

5. A pipe fitting according to claim 1, wherein there is an intermediate layer between the innermost layer and the outer layer.

6. A pipe fitting according to claim 5, wherein the intermediate layer is a foamed plastic material layer.

7. A pipe fitting according to claim 1, wherein the outer surface of the pipe fitting is of the same color as the at least two pipes to be connected to the pipe fitting.

8. A pipe fitting according to claim 1, wherein the end of the outer layer is arranged to function as a stop member of the at least one of the at least two pipes to be inserted into the pipe fitting.

9. A pipe fitting according to claim 1, wherein the UV protection of the outer surface of the pipe fitting is intensified with metal or mica pigment.

10. A pipe fitting according to claim 1, wherein a compression collar is arranged to be used to guarantee the connection between the pipe fitting and at least one of the at least two pipes.

11. A pipe fitting according to claim 10, wherein the outer diameter of the pipe fitting is arranged to be equal to the outer diameter of the compression collar.

12. A pipe fitting according to claim 10, wherein the color of the compression collar is substantially the same as the color of the pipe fitting.

13. A pipe fitting according to claim 12, wherein the outer surface of either the compression collar or the pipe fitting is embossed.

14. A pipe fitting according to claim 10, wherein the end of the compression collar on the side of the at least one of the at least two pipes is rounded.

15. A pipe fitting according to claim 10, further comprising a support is intended to be used in connection with the pipe fitting, the support having a support collar whose width is substantially equal to the width of the compression collar and whose outer diameter is substantially equal to the outer diameter of the compression collar.

16. A pipe fitting according to claim 15, wherein the at least two pipes, the support, the pipe fitting and the compression collar are substantially of the same color.

17. A pipe fitting according to claim 1, wherein in connection with the pipe fitting a plastic composite pipe having a plastic innermost layer and a metal layer outside it is intended to be used; the outer surface of the plastic composite pipe is of metal color, the color being provided by using a transparent extruded plastic material upon the metal layer, or in such a way that a surface is extruded upon the metal, which surface is colored using pearlescent, metal-colored or mica pigments.

18. A pipe fitting according to claim 1, wherein the outer layer is formed as a separate and replaceable part.

* * * * *